3,442,698
Patented May 6, 1969

1

3,442,698
CELLULOSIC WEBS TREATED WITH A DERIVATIVE OF AN ALKYL VINYL ETHER/MALEIC ANHYDRIDE INTERPOLYMER
Dale R. Dill and Donald N. Van Eenam, St. Louis, Mo., assignors to Monsanto Company, St. Louis, Mo., a corporation of Delaware
No Drawing. Filed Feb. 4, 1966, Ser. No. 525,113
Int. Cl. C08c 17/16
U.S. Cl. 117—155          8 Claims

ABSTRACT OF THE DISCLOSURE

Cellulosic webs treated with a water dispersible derivative of an alkyl vinyl ether/maleic anhydride interpolymer.

This invention relates to the surface treatment of preformed cellulosic webs, particularly cellulose containing paper, with synthetic resins. More particularly, this invention provides cellulose containing products treated with partcular water dispersible resins to impart to the treated cellulosic product improved resistances to penetration thereof by moisture, ink, lactic acid, and food juices.

An object of this invention is to provide the papermaking and paper using trades with cellulose containing paper products surface treated with certain water dispersible synthetic interpolymers to effect improved sizing thereof.

A further object of the invention is to provide an improved method for effecting the economical surface sizing of cellulosic webs with starch and proteinaceous materials by applying to the web an aqueous dispersion of the starch or protein and certain interpolymers hereinafter described.

Other related objects will become apparent by reading the following description of the invention and the appended claims.

Briefly, the objects set forth above are accomplished by applying to the surface of the cellulosic web, which is preferably a paper web, sheet, or board, or a mat of cellulose containing fibers pressed to a predetermined shape, an aqueous dispersion, preferably a water solution, of an alkyl vinyl ether/maleic anhydride interpolymer derivative in which interpolymer the alkyl groups of the alkyl vinyl ether moieties have an average of from 8 to about 24 carbon atoms, the water dispersible form of the interpolymer being obtained by treating the copolymer with a basic material such as ammonia, ammonium hydroxide, lower molecular weight amines, or an alkali metal hydroxide to form the partial amide, half ammoninum salt, the diammonium salt, amide-amine salt, or the alkali metal salt derivative. The interpolymer which is treated with the basic material to form the water dispersible or water soluble form thereof, includes the partial alkyl esters of said interpolymers formed by an anhydride ring-opening esterification of the maleic anhydride groups of the interpolymer, or of the starting maleic monomer material. Such esterification may take place either during the polymerization reaction or thereafter as a separate reaction. Up to about fifty mole percent of the carboxyl groups may be esterified in this manner before base treatment. The aqueous interpolymer

2 salt dispersion may be applied alone, e.g. as a surface sizing solution to the paper web. It may also be applied in combination with starch or protein as a starch or protein modifier to improve the effectiveness of the starch or protein size, or it may be applied as a separate operation before or after the starch or protein surface size treatment.

The term "alkyl vinyl ether/maleic anhydride interpolymer" is used herein as a general term to describe the polymeric materials which are used in preparing the surface sizes of this invention. The interpolymer usually contains essentially equimolar proportions of one or more alkyl vinyl ether monomers and maleic anhydride or equivalent carboxyl containing monomer, but the molar ratio of alkyl vinyl ether type monomer to the maleic anhydride type comonomer may vary in the interpolymer from about 1:0.90 to about 1:1.8, if desired. The best sizes are made from interpolymers having substantially alternating alkyl vinyl ether and maleic anhydride monomer units. The alkyl vinyl ether must constitute the predominant portion of the non-carboxyl containing monomer for this invention and is present in amounts sufficient to impart the desired hydrophobicity, but minor proportions of the alkyl vinyl ether monomer may be replaced by or diluted with non-alkyl vinyl ether polymerizable monomers to help increase the molecular weight of the interpolymer, to lower the hydrophobic content of the polymer, and to lower the cost of the interpolymer if desired. Such monomers may be present in amounts constituting up to about 30 percent by weight of the non-carboxyl monomer content but generally will be present in amounts ranging up to about 10 percent of the non-carboxyl monomer. Examples of comonomers which can be used for such purposes are diisobutylene, vinyl toluene, styrene, methylmethacrylate, acrylonitrile.

For reasons of availability and favorable cost, maleic anhydride is preferred as the carboxyl containing monomer for making the interpolymer surface sizes of this invention. However, unsaturated polybasic acid anhydrides having from 4 to 10 carbon atoms could readily be used to prepare the interpolymers and are included as being useful for interpolymer preparation. Examples of such anyhdride materials include itaconic acid anhydride, aconitic acid anhydride, citraconic acid anhydride, chloromaleic anhydride, etc. Useful non-anhydride materials which may also be used include lower alkyl maleic acid partial esters such as mono-methyl acid maleate, fumaric acid, and other copolymerizable related homologous unsaturated polybasic carboxylic acids such as fumaric acid, and 1,6-hexen-3-ylenedicarboxylic acid. The carboxyl content of the interpolymer may also be provided in minor amount, say in amounts up to about 10 percent by polymerizable olefinically unsaturated monocarboxylic acids such as acrylic acid, crotonic acid, etc.

The interpolymers used in the making of anionic surface sizes for this invention are prepared in conventional manner with or without solvents such as benzene, toluene, and xylene, and using catalysts such as azobis(isobutyronitrile), di-tert-butyl peroxide, tert-butyl perbenzoate, benzoyl peroxide, and any initiator which will be effective at from about 50–150° C. such as isopropyl peroxydicarbonate, tetrachlorobenzoyl peroxide, and the like. The interpolymers employed for the making of surface sizes in accordance with this invention have molecular weights higher than 10,000 and may range up to about 200,000. We have found that the interpolymers which make the better surface sizes have specific viscosities (1% of the interpolymer in methylethyl ketone viscosity by Ostwald capillary method, multiplied by 4) between about 1 and 2, although interpolymers having specific viscosities of from about 0.5 to 3.0 by this method may be used. In some instances the interpolymers are prepared in the presence of diluent mixtures containing an alkanol such as xylene containing small amounts, generally under 10 weight percent of methanol, isopropanol, dodecanol, or mixed higher alkanols which cause an anhydride ring-opening partial esterification of the resulting maleic acid carboxyl groups. These interpolymers may also be used in preparing the surface sizing agents used in this invention.

The alkyl vinyl ethers which are used in preparing the interpolymers described above may be prepared by treating the selected higher carbon content alkanol, or a mixture of such alkanols with an alkali metal oxide, or hydroxide thereof and then reacting the resulting product with acetylene. The alcohols used can be straight or branched chained, and may be obtained from natural products such as coconut oil, soybean oil, etc., or be synthetically made, e.g. by the "oxo" process. The higher alkyl vinyl ethers are preferred for reasons of performance in sizing, availability, and cost but may be replaced in part in making the interpolymer by other related vinyl ethers containing from say 3 to about 40 carbon atoms such as alkenyl, aryl, alkylaryl, alkyloxyaryl, aryloxyalkyl vinyl ethers and the like, used in such proportions that the average carbon content in the non-vinyl moiety of the total vinyl ether content of the interpolymer is from about 8 to about 24 carbon atoms. Representative vinyl ethers include the alkyl vinyl ethers such as octyl, decyl, dodecyl, tridecyl, tetradecyl, octadecyl, eicosyl, tetracosyl vinyl ethers, which are preferred, and the alkenyl vinyl ethers such as allyl, octenyl, tridecenyl, heptadecenyl, unicosenyl vinyl ethers, the aryl vinyl ethers such as phenyl, naphthyl, and biphenyl vinyl ethers, the alkylaryl vinyl ethers such as nonyphenyl, dodecylnaphthyl, and methylbiphenyl vinyl ethers, the alkyloxyaryl vinyl ethers such as methoxyphenyl, decyloxyphenyl, and pentadecyloxynaphthyl vinyl ethers, the aryloxyalkyl vinyl ethers such as phenoxyoctyl, naphthyloxyhexyl, and phenoxydodecyl vinyl ethers, etc.

For the surface sizing applications of this invention it is essential to convert the above described interpolmers to a form in which the polymer is at least partially anionic in the carboxyl groups thereof, but which preferably also contain amidated carboxyl groups. The interpolymer may be treated with any proton donating source in the presence or absence of water which will convert the anhydride content of the interpolymer to carboxyl groups. However, the best surface sizes are obtained from interpolymers in which some of the carboxyl groups are amidated which can be accomplished with anhydrous ammonia, a lower molecular weight amine, or with concentrated ammonium hydroxide. For reasons of ease of conversion and simplified handling problems, it is preferred to treat the interpolymer with concentrated ammonium hydroxide (25–29 percent) which effects partial amidation of the interpolymer, forming a half-amide half-ammonium salt of the interpolymer. Primary and secondary amines having molecular weights below about 300 may also be used to effect partial amidation of the carboxyl groups of the interpolymer. For such purpose, lower alkyl amines such as methylamine, ethylamine, isopropylamine, tert-butylamine, dialkylamines such as dimethylamine, diethylamine, as well as the alkanolamines such as propanolamine, diethanolamine, etc., may be used. They may be used as the only base to effect ring opening or in combination with a base such as ammonium hydroxide or an alkali metal hydroxide. The ammonium and alkali metal salt derivatives of the interpolymers, obtained by treating the interpolymer with dilute ammonium hydroxide or with dilute or concentrated alkali metal hydroxides may also be used to effect sizing. Tertiary alkylamines such as triethylamine, tributylamines could also be used to effect water solubilization of the polymer. Tertiary amines do not form amides of the polymer but tertiary amine treated interpolymers form water dispersible amine salt interpolymers when placed in water.

The base treated interpolymer is dissolved or water emulsified dispersed from may be applied directly to a cellulose web, such as a paper web or a cotton textile by known methods such as by tub sizing, brush application, spray application to a porous substrate to effect a penetrating surface sizing treatment of the substrate, or may be applied by wire rod draw down methods or roll coater methods to effect a more superficial surface size treatment. The water dispersed interpolymer derivative may be diluted to any desired concentration consistent with the type of sizing intended and dependent upon the method of application. Generally, the concentration of the interpolymer derivative may vary from about 0.1 percent to about 25 percent by weight of the interpolymer.

The interpolymer derivative may be mixed dry or in aqueous dispersed form with starch, starch derivative, or proteinaceous material such as casein, or soybean protein to improve the properties of the starch or protein sizing applied to the cellulosic substrate. Although any desired proportions may be used, it is generally contemplated to mix from about 1 percent to about 95 percent of the interpolymer derivative with the starch or protein, based on the weight of the starch, or protein to which it is added. The interpolymer derivative may be mixed with the starch, or starch product before cooking, and cooked therewith or mixed therewith after cooking. These interpolymer derivatives may also be mixed with raw starch and enzymes which convert the starch in the presence of the interpolymer derivative resin, in a basic pH, i.e., say at a pH of from 8 to 10.

The starches and starch products with which these resinous interpolymer derivatives may be mixed are those which are commonly used in cellulosic web surface sizing and coating applications including corn starch, potato starch, sago starch, wheat starch, as well as the various starch products and derivatives including British gums, enzyme converted starches, hydroxyethylate starches, oxidized starches, and cationic starches having quaternary ammonium or other amine salt groups therein.

Cellulosic paper webs which may be sized in accordance with this invention include those papers and fiber boards obtained from conventionally prepared pulps, e.g., sulfite, sulfate, rag stock, pulps, and papers containing pigment fillers such as clay, titanium dioxide, etc., as well as fibrous products derived from cellulosic pulps and various synthetic pulps and fibers such as polyacrylonitrile, polyamide, polyester fibers, regenerated cellulose, etc. The paper treated in accordance with this invention may be any waterleaf, slack-sized, or hard sized paper. In addition to cellulosic webs such as paper and matted cellulose forms, other materials which may be sized with these materials include cotton fibers, filaments, threads, textiles, regenerated cellulose containing materials, as well as textiles such as polyacrylonitrile polyester polyamide fabrics.

The invention is further illustrated by the following examples.

Example 1

This and the following example illustrate typical preparations of interpolymers which are used in preparing the surface sizing materials of this invention.

Tridecyl vinyl ester (113.2 g., 0.500 mole) and toluene (162.2 g.) were heated under a stream of nitrogen to 76° C. Azo-bis-isobutyronitrile (AIBN) (0.42 g., 0.50 mol. percent based on maleic anhydride) was added and the mixture was stirred 15 minutes to insure removal of all inhibitory materials. Molten maleic anhydride (49.1 g., 0.500 mole) was added at a uniform rate over 1 hour, maintaining the temperature at 75-77° C. The mixture was held at 75° C. for 1 hour after the end of the addition, to insure complete reaction.

Solid tridecyl vinyl ether/maleic anhydride interpolymer was isolated by drying in a vacuum oven for 2 hours at 135° C. The solid thus obtained was ground in a Waring Blendor and passed through a 60-mesh screen.

Specific viscosity (1 g. solid in 100 ml. of methyl ethyl ketone solution) of this product multiplied by 4 was 1.86.

Example 2

This example illustrates the preparation of another size product using oxo-decyl vinyl ether as the comonomer with the maleic anhydride.

Copolymerization.—To 184.3 g. of oxo-decyl vinyl ether heated as described in Example 1, 98.0 g. of maleic anhydride dissolved in 250 g. of xylene and added uniformly in 4.3 hours an the AIBN, 0.80 g. in 10 ml. of benzene was added as follows: 2.0 ml. initially, and the remainder in 0.5 ml. portions during 4 hours. An additional 80 ml. of xylene was added to promote mixing of the viscous solution during the two-hour completion period. This viscosity of the copolymer was 2.75 (four times 1% copolymer in methyl ethyl ketone).

Example 3

For use as a surface sizing agent on paper, a tridecyl vinyl ether/maleic anhydride copolymer having a specific viscosity of about 1.12 was formed into the half-amide half-ammonium salt thereof (TDVE/MA–$NH_2$–$NH_4$) with anhydrous ammonia and then in this water soluble form was dissolved in water to a 2 percent polymer in water solution. This polymer solution was brushed on to samples of a (basis weight 50 lbs.) water-leaf paper (Mead Corporation TO–149) and then the excess was removed by passing the polymer treated paper through a wringer. The impregnated papers thus obtained were dried and stabilized by hanging them in a constant temperature 72° F. and humidity (50% relative humidity) room for 24 hours and then tested for the amount of sizing imparted to the sheet by the treatment using a 50 percent lactic acid aqueous solution drop test [measured as time (in seconds) taken by drops of lactic acid solution placed on test paper web to penetrate into the web], and an ink penetration test [measured as time (in seconds) taken for ink to penetrate to upper observed surface of test sheet floated on bath of permanent blue-black ink kept at pH 1.5 and 33° C.].

Samples of the same waterleaf paper were also treated with an amide-$NH_4$ salt of a copolymer of a higher alkyl mixed olefin ($C_{14}$–$C_{18}$)/maleic anhydride copolymer (O/MA, $NH_2$–$NH_4$) in 1 and 2 percent concentration, with the excess being removed in tht same manner, dried, and stabilized and tested in a similar manner.

The comparative results in the sizing effectiveness is summarized in the following table:

TABLE I

| Test | TDVE/MA $NH_2$–$NH_4$ | | O/MA $NH_2$–$NH_4$ | |
| --- | --- | --- | --- | --- |
| | 2% | 1% | 2% | 1% |
| Lactic acid drop test (sec.) | 10,000+ | 485 | 1,121 | 186 |
| Ink penetration (sec.) | 500 | 198 | 175 | 65 |

The lactic acid drop test and the ink penetration results show that the tridecyl vinyl ether/maleic copolymer is substantially better as a sizing agent than the higher alpha-olefin hydrocarbon/maleic copolymer.

Example 4

Samples of an aqueous dispersion of a low viscosity (fluidity of about 80) hydroxyethylated corn starch ("Penford Gum 280") containing about 8 percent starch solids were modified by incorporating therein 5 percent by weight, based on the weight of the starch, of a half amide-half ammonium salt derivative of a tridecyl vinyl ether/ maleic anhydride copolymer having a specific viscosity of about 1.54. These dispersions were applied to waterleaf paper by the wringer method as described in Example 3, dried and stabilized, and tested for the amount of surface sizing effected by the treatment with these modified starch dispersions. Similar paper sheets were treated with unmodified starch dispersions of the same total solids concentration. For comparison a higher alkyl ($C_{14}$–$C_{18}$) mixed olefin/maleic anhydride copolymer converted to the half amide-half ammonium salt were also mixed with starch at the 5 percent by weight level, based on the weight of the starch. The results are summarized in the following table.

TABLE II

| Test | Starch only | Starch+ TDVE/MA $NH_2$–$NH_4$ | Starch+ O/MA $NH_2$–$NH_4$ |
| --- | --- | --- | --- |
| Lactic acid drop test (sec.) | 192 | 10,000+ | 2,150 |
| Ink penetration (sec.) | 12 | 360 | 102 |

These results show that the half amide-half ammonium salt derivative of the tridecyl vinyl ether/maleic anhydride copolymer improves the starch surface sizing of paper substantially over a similar derivative of the alpha-olefin hydrocarbon/maleic anhydride copolymer at this low level of starch modification.

Example 5

This example shows the effectiveness of various derivatives of the higher alkyl vinyl ether/maleic anhydride copolymers as surface sizing agents, both with and without starch, using tridecyl vinyl ether/maleic anhydride copolymers having specific viscosities ranging from 1.12 to 1.90 as representative copolymers. The derivatives made and tested were as follows:

(A) A tridecyl vinyl ether/maleic anhydride copolymer, specific viscosity 1.54, treated with dilute aqueous sodium hydroxide, and applied as a 1% by weight solution.

(B) The same copolymer derivative as in (A), applied in an aqueous 8 percent by weight starch dispersion containing 5 percent by weight of the copolymer derivative, based on the weight of the starch.

(C) A tridecyl vinyl ether/maleic anhydride copolymer having a specific viscosity of 1.12, treated with dilute aqueous ammonium hydroxide, and applied as a 1 percent solution.

(D) A tridecyl vinyl ether/maleic anhydride copolymer having a specific viscosity of 1.90, converted to the partial isobutyl ester and treated with ammonia, and applied in an 8 percent by weight starch solids aqueous dispersion containing 5 percent of the copolymer derivative, based on the weight of the starch.

The results were as follows:

TABLE III

| Test | Copolymer | | | |
| --- | --- | --- | --- | --- |
| | A | B | C | D |
| Lactic acid drop test (sec.) | 274 | 10,000+ | 666 | 310 |
| Ink penetration (sec.) | 65 | 102 | 62 | |

Example 6

This example illustrates the use of a water soluble decyl vinyl ether/maleic anhydride derivative as a modifier for starch used in the surface sizing of cellulosic paper.

Two decyl vinyl ether/maleic anhydride copolymers having specific viscosities of 1.99 and 1.07 were treated with ammonia gas to convert them to the water soluble half-amide, half ammonium salt derivatives, and then mixed with a water dispersion containing 8 wt. percent of a low viscosity hydroxyethylated corn starch at a rate of 5 percent by weight, based on the weight of the starch. The decyl vinyl ether/maleic derivative modified starch dispersion thus obtained was applied to waterleaf paper by wringer method, and the treated papers thus obtained were either air dried for 24 hours or partially air dried and then placed in an oven at 120° F. for 2 minutes and then tested for the amount of sizing by a standard 50% Lactic Acid Drop test and a Modified Penescope test, against a control involving the sizing of paper with the same starch but without any decyl vinyl ether/maleic derivative. The results were as follows:

TABLE IV

| Test | Sizing agent | | | | | |
|---|---|---|---|---|---|---|
| | Starch only, control | | Starch +1.99 DVE/MA NH$_2$–NH$_4$ [1] | | Starch +1.07 DVE/MA NH$_2$–NH$_4$ [1] | |
| | Air | 2 min. | Air | 2 min. | Air | 2 min. |
| Lactic acid drop test (sec.) [2] | 79 | 86 | >9,000 | >9,000 | >9,000 | >9,000 |
| Modified penescope (in.) [3] | 20.25 | 19 | 28.5 | 29.25 | 26.75 | 24.25 |

[1] 1.99 and 1.07 DVE/MA NH$_2$–NH$_4$ indicates the decyl vinyl ether/maleic anhydride copolymer having the specific viscosity of 1.99 or 1.07, converted to the half amide, half ammonium salt.
[2] The lactic acid drop test involves the measuring in seconds the time needed for drops of 50% aqueous lactic acid to penetrate the test sheet.
[3] The modified penescope test involves a measure in inches of the hydrostatic pressure of water withstood by the test sheet against a steadily rising column of water before 5 drops of water penetrated through the test sheet.

What is claimed is:
1. A cellulosic pre-formed cellulosic web having applied to the surface thereof a sizing amount of a water dispersible derivative of an alkyl vinyl ether/maleic anhydride interpolymer having an average of from 8 to about 24 carbon atoms in the alkyl groups of the alkyl vinyl ether moiety, wherein the molar ratio of the alkyl vinyl ether to the maleic anhydride in the interpolymer is from about 1:0.9 to about 1:1.8, said water dispersible derivatives of said copolymer being obtained by treating said interpolymer with at least one member of the group consisting of alkylamines having a molecular weight below about 300, ammonia, ammonium hydroxide, and alkali metal hydroxides.

2. A sized cellulosic web as described in claim 1 wherein the alkyl vinyl ether/maleic anhydride interpolymer is a tridecyl vinyl ether interpolymer and is treated with ammonia to effect partial amidation of the carboxyl groups of said interpolymer.

3. A sized cellulosic paper as described in claim 1 wherein the alkyl vinyl ether/maleic anhydride interpolymer is a tridecyl vinyl ether/maleic anhydride interpolymer and is treated with concentrated ammonium hydroxide to effect partial amidation of the carboxyl groups of said interpolymer.

4. A sized cellulosic web as described in claim 1 wherein the water dispersible alkyl vinyl ether/maleic anhydride interpolymer derivative is applied to the web in combination with starch.

5. A sized cellulosic web as described in claim 4 wherein the water dispersible alkyl vinyl ether/maleic interpolymer is a tridecyl vinyl ether/maleic anhydride interpolymer which is treated with ammonia to effect partial amidation of the interpolymer.

6. A sized cellulosic web as described in claim 4 wherein the alkyl vinyl ether/maleic anhydride interpolymer is a tridecyl vinyle ether/maleic anhydride interpolymer water solubilized by treating the copolymer with aqueous sodium hydroxide.

7. A sized cellulosic web as described in claim 1 wherein the alkyl vinyl ether/maleic anhydride interpolymer is a decyl vinyl ether interpolymer and is treated with ammonia to effect amidation of the carboxyl groups of said interpolymer.

8. A sized cellulosic web as described in claim 1 wherein the alkyl vinyl ether/maleic anhydride interpolymer is a decyl vinyl ether/maleic anhydride interpolymer treated with concentrated ammonium hydroxide to effect partial amidation of the carboxyl groups of said interpolymer.

References Cited

UNITED STATES PATENTS

| Re. 23,514 | 6/1952 | Voss et al. | 260—875 X |
| 2,756,163 | 7/1956 | Herrick et al. | 117—155 X |
| 2,782,182 | 2/1957 | Verburg | 260—78.5 |
| 3,113,064 | 12/1963 | Cukier | 162—168 X |
| 3,157,595 | 11/1964 | Johnson et al. | 162—168 X |
| 3,261,798 | 7/1966 | Farley | 162—168 X |
| 3,345,289 | 10/1967 | Freifeld et al. | 260—29.6 X |
| 3,368,987 | 2/1968 | Pollart et al. | 117—155 X |

WILLIAM D. MARTIN, *Primary Examiner.*

M. LUSIGNAN, *Assistant Examiner.*

U.S. Cl. X.R.

117—156, 161; 260—29.6, 78.5